(12) United States Patent
McCoy et al.

(10) Patent No.: US 7,128,631 B2
(45) Date of Patent: Oct. 31, 2006

(54) SOFT LITHOGRAPHIC PROCESS FOR FABRICATING INTEGRATED ITO ELECTRODE-LIQUID CRYSTAL ALIGNMENT LAYERS

(75) Inventors: Christopher H. McCoy, Natick, MA (US); John T. Chen, Somerville, MA (US); David R. Beaulieu, Groton, MA (US)

(73) Assignee: Surface Logix, Inc., Brighton, MA (US)

( * ) Notice: Subject to any disclaimer, the term of this patent is extended or adjusted under 35 U.S.C. 154(b) by 0 days.

(21) Appl. No.: 10/714,190

(22) Filed: Nov. 14, 2003

(65) Prior Publication Data

US 2004/0266307 A1     Dec. 30, 2004

Related U.S. Application Data

(60) Provisional application No. 60/427,738, filed on Nov. 20, 2002, provisional application No. 60/426,160, filed on Nov. 14, 2002.

(51) Int. Cl.
*H01J 9/00*     (2006.01)
*B41M 1/10*     (2006.01)
(52) U.S. Cl. ......................... 445/24; 430/198
(58) Field of Classification Search .................. 445/24, 445/25; 428/411.1, 914; 430/198, 256
See application file for complete search history.

(56) References Cited

U.S. PATENT DOCUMENTS 5,507,404 A    4/1996   Ruy ........................... 216/24
6,156,433 A    12/2000  Hatori et al. ............ 428/411.1

*Primary Examiner*—Joseph Williams
(74) *Attorney, Agent, or Firm*—Wilmer Cutler Pickering Hale and Dorr LLP

(57) ABSTRACT

A system and method are described for self-aligning electrodes for color filters of passive matrix displays.

20 Claims, 9 Drawing Sheets

SOFT LITHOGRAPHIC PROCESS FOR FABRICATING INTEGRATED ITO ELECTRODE-LIQUID CRYSTAL ALIGNMENT LAYERS

RELATED APPLICATIONS

This application claims the benefit of priority under 35 U.S.C. § 119(e) from U.S. Provisional Application Ser. No. 60/426,160 filed Nov. 14, 2002, entitled "Self-Aligned Structures and Method of Making Same" and U.S. Provisional Application Ser. No. 60/427,738 filed Nov. 20, 2002, entitled "A Soft Lithographic Process for Fabricating Integrated ITO Electrode Liquid Crystal Alignment Layers", which are incorporated herein by reference.

FIELD OF THE INVENTION

The present invention relates to systems and methods to self-aligning structural layers that may be used in electronic display elements. More specifically, the present invention relates to systems and methods for self-aligning electrodes that may be used for color filters in electronic display elements.

BACKGROUND OF THE INVENTION

Liquid crystal displays (LCDs) use nematic liquid crystals sandwiched between glass plates to modulate light transmission through the display. When an electric field is applied to the liquid crystal layer by transparent ITO electrodes, the LC molecules, which are elongated in shape, align themselves parallel to the applied field and normal to the glass plates. In this state, polarized light travels through the LC layer without having its polarization state rotated. Because the LC module is placed between crossed polarizers, the display appears dark. In order for displays to allow light through when the applied field is off, the liquid crystal director on opposite sides of the glass chamber must be oriented 90° with respect to each other. In this situation, the polarization state of the light is rotated by 90° and exits parallel to the analyzer, thus making the display appear light. The orientation of the LC director at the surface of each glass plate is controlled by a so-called rubbing layer which is typically a polyimide layer that has undergone successive mechanical rubbing steps to create alignment of the polymer chains and mechanical grooving of the surface. This surface treatment induces the LCs to align parallel to the rubbing direction. In the current LCD manufacturing process, separate layers are used for the transparent ITO electrodes and the polyimide rubbing layers.

FIG. 1, generally at 100 shows a conventional passive matrix display. The conventional display in FIG. 1 includes a front plate and a back plate. The front plate includes glass plate 108 with a polarizing filter 110 at its exterior surface. Color filters 112, 114, and 116, red, green, and blue, respectively, are disposed on interior surface of the glass plate. The color filters 112, 114, and 116 are disposed adjacent one another. The filters are covered by transparent plate 118. Spaced apart transparent electrode 120 of ITO are disposed on the plate. These electrodes precisely overlay the color filters. Interior to transparent electrodes 120 is liquid crystal alignment layer 122.

The back plate consists of glass plate 102 that has polarizing filter 104 disposed at its exterior surface. The interior surface of glass plate 102 has spaced apart transparent electrodes 106 made from ITO disposed there. These electrodes are disposed perpendicular to electrodes 120 of the front plate. Interior to transparent electrodes 106 is alignment layer 107.

The two alignment layers are spaced apart by a spacer 124. Liquid crystals 126 are disposed in the spacer between the alignment layers.

There needs to be easy and efficient method to align the electrodes with the color filters.

SUMMARY OF THE INVENTION

The present invention is directed to systems and methods for self-aligning electrodes for color filters of passive matrix displays. The present invention includes forming the front plate of a display by molding matrix lines on a substrate. These form black matrix lines. The black matrix lines define the boundaries for the red, green, and blue color filters. The black matrix lines block the transmission of light between pixels.

Next, the red, green, and blue color filters are molded onto the substrate in the red, green, and blue color areas defined by the black matrix lines. The color filters extend above the black matrix lines. Following the disposition of the color filters, an ITO layer is deposited on top of the color filter and black matrix lines. The ITO will be used to form the transparent electrodes.

A flat stamp coated with etch-resist is contacted with the ITO. This will coat the ITO on the color filters with etch-resist but not the ITO covering the black matrix lines.

Following the coating of the ITO covering the color filters, the structure is etched to remove the ITO in the recesses over the black matrix lines. This will define electrically isolated self-aligned pixel electrode lines on the color filters.

DETAILED DESCRIPTION OF THE INVENTION

The present invention is a method for self-aligning transparent electrodes and color filters of passive matrix displays. The present invention also includes systems for forming self-aligned transparent electrodes and color filters. Further, according to the present invention, surface chemistry and contact printing are used in combination with surface topology to create self-aligned electrodes. This results in significant efficiency in forming passive matrix displays.

Figure 1:
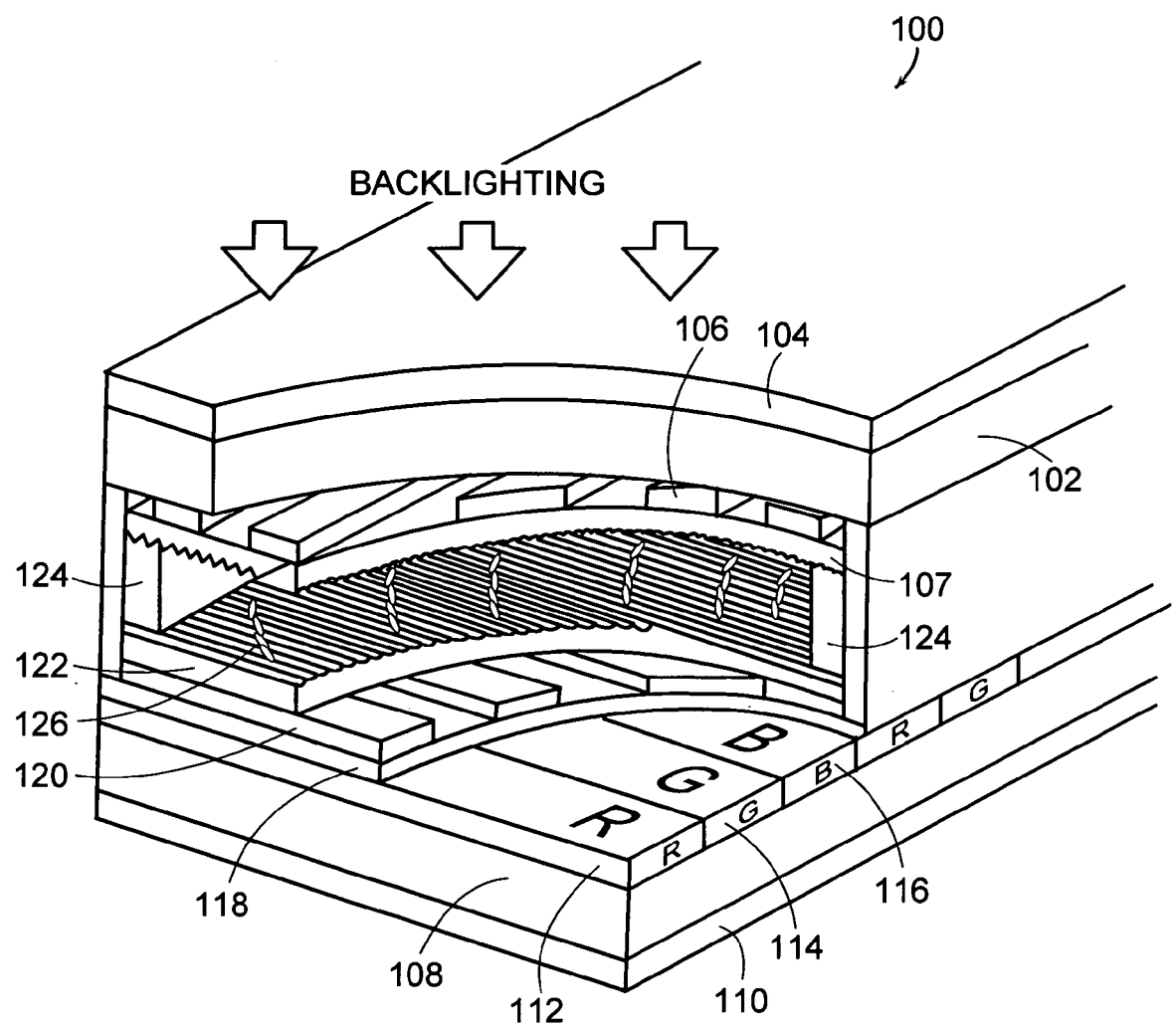
FIG. 1 shows a cross-sectional view of prior art passive matrix display.
Figure 2:
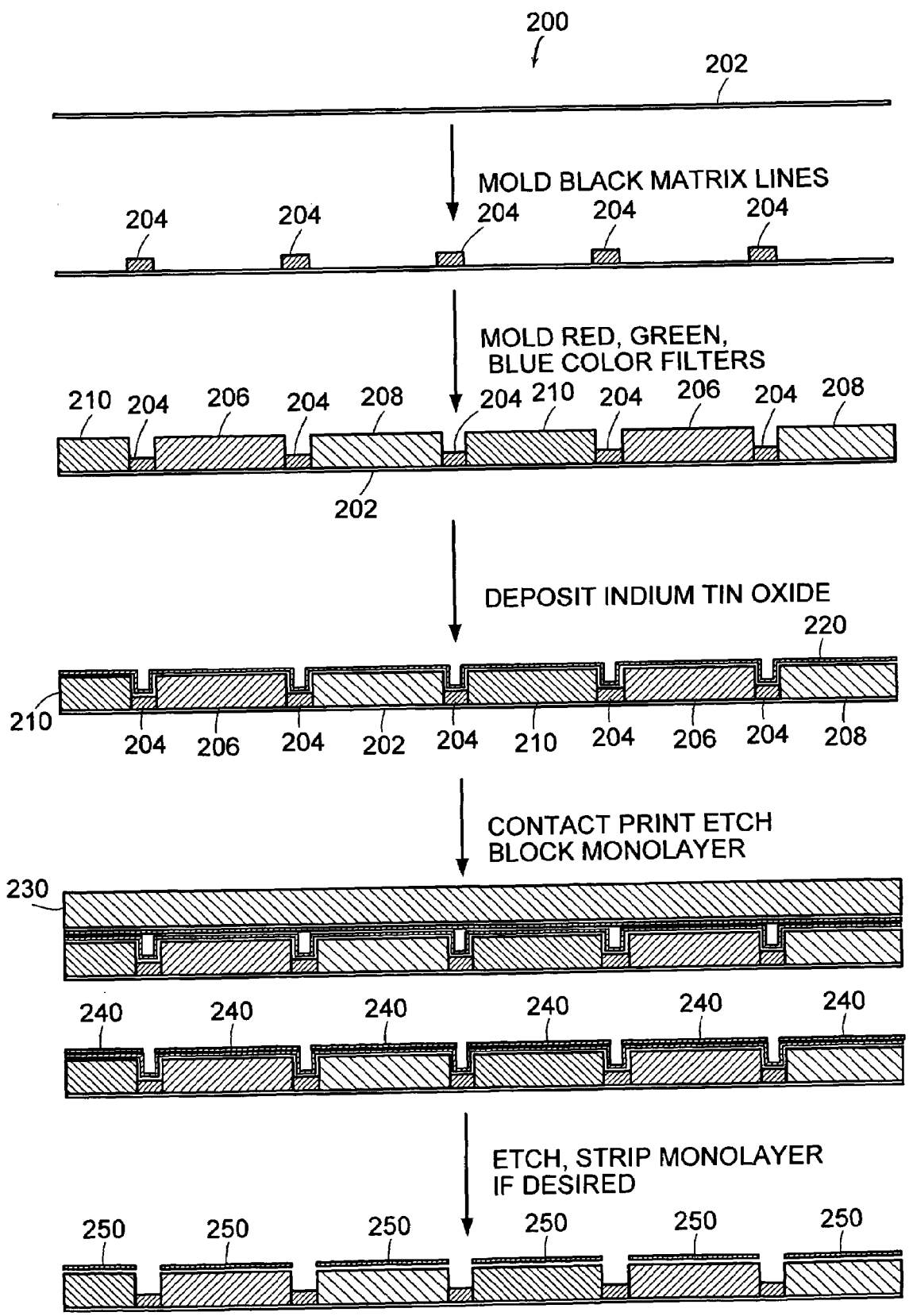
FIG. 2 shows a method for fabricating a passive matrix display front plate.

Referring to FIG. 2, generally at 200, a method for forming front plate of a passive matrix display will be described. Now referring to FIG. 2, glass substrate 202 has lines 204 of a light blocking material disposed the length of the display to form a predetermined percentage, preferably one-half, of the "black matrix". The black matrix lines 204 define the boundaries of the individual red, green and blue color filter areas and function to block transmission of light between pixels in the inactive regions of the display.

In the next step of the method, red filters 206, green filters 208, and blue filters 210 are molded onto substrate 202 by conventional methods in the individual red, green and blue color areas defined by black matrix line 204. As is shown, the first two steps preferably alignment of the color filters and black matrix structures is achieved.

After the color filters are deposited on substrate 202 between black matrix lines 204 transparent conductor indium tin oxide ("ITO") layer 220 is deposited on top of color filters and black matrix lines 204. ITO is a standard material for pixel electrodes because of its properties. It is electrical conductive and transparent to visible light. Since the ITO deposition is conformal, the ITO atop color filters 206, 208, and 210 is raised with respect to the recessed black matrix lines 204. This surface topology is used to pattern ITO 220 into pixel address lines.

Flat stamp 230 (no features are required) coated with an etch-resist forming species that forms a self-assembled monolayer (or other surface modification that can serve as an etch resist) is contacted with the assembly. Because of the surface topology, the etch-resist is transferred at 240 only to ITO 220 aligned with color filters 206, 208, and 210, thus achieving self-alignment. Following this step, ITO 220 is etched (using, for example, aqueous hydrochloric acid) to remove material in the recessed areas over black matrix lines 204 to define electrically isolated, self-aligned pixel electrode lines 250. The surface layer (self-assembled monolayer or other surface modification species) can be removed if necessary or left in place. A system for carrying out the method described in FIG. 2 will be described with respect to FIG. 6.

In another embodiment of the method of the present invention, black matrix lines 204 and red, green and blue color filters 206, 208, and 210, respectively, can be molded directly onto the layer of polarizing film which may then be part of the display.

Figure 3:
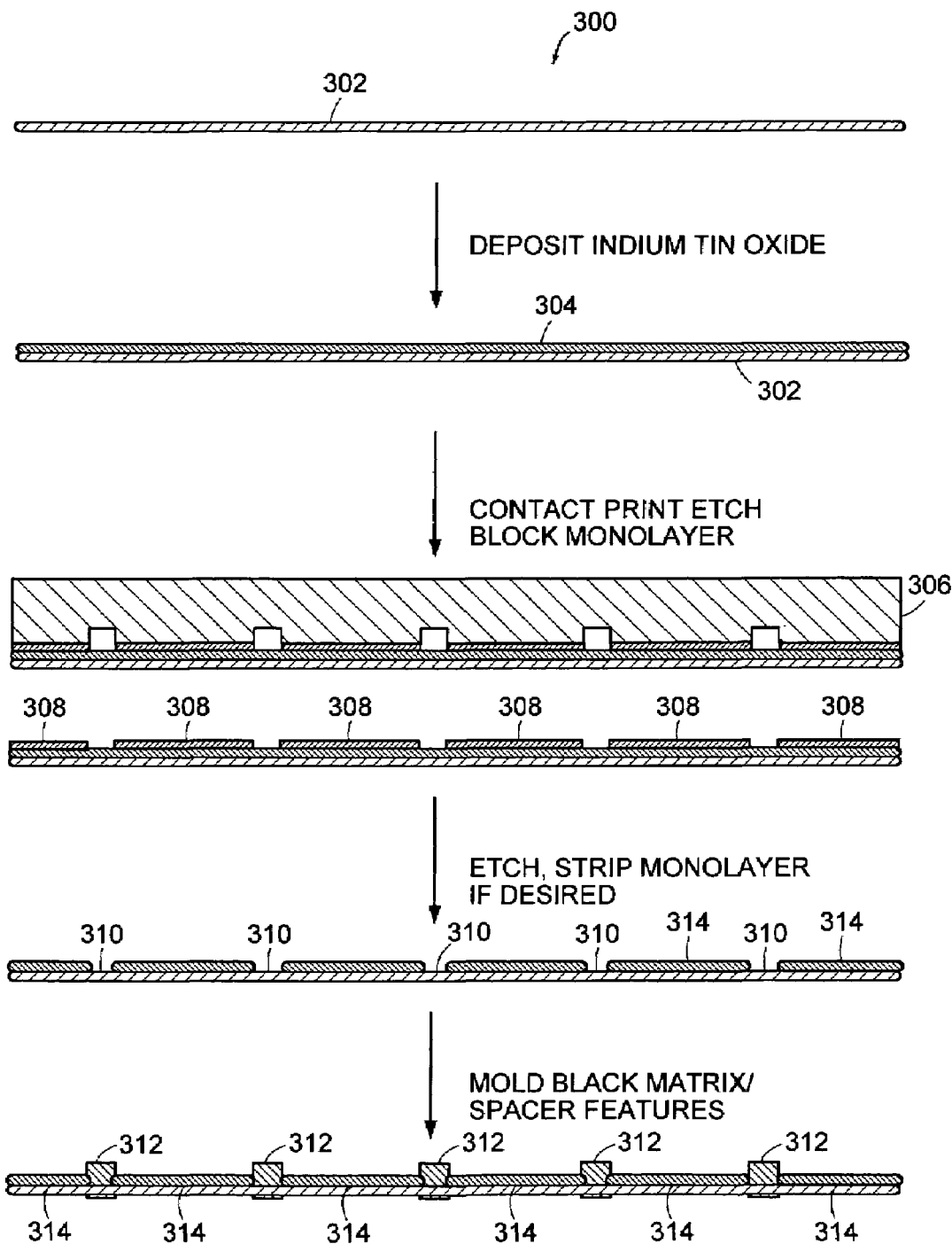
FIG. 3 shows a method for fabricating a passive matrix display back plate.

Referring to FIG. 3, generally at 300, a method to fabricate a back plate of a passive matrix display will be described. Glass substrate 302 has ITO layer 304 deposited on it by conventional means. In an alternative embodiment, ITO layer 304 may be directly deposited onto a polarizing film that would be part of the display.

Stamp 306 having a patterned surface has a surface-modifying etch-resist forming species 308 disposed on it. Stamp 306 with the pattern of etch-resist is brought in contact with ITO 304 to microcontact print the pattern onto ITO 304. This transfers the pattern onto the ITO to define the electrode lines for the back plate of the display. The ITO is etched which removes the ITO from the areas where etch-resist was not applied as shown at 310.

Finally, black matrix lines 312 are molded onto the substrate between the ITO addressing lines 314. The height of black matrix lines 312 is chosen such that when the front and back plates of the display are placed together, black matrix lines 212 serve to maintain an appropriate separation between the two plates.

A system for forming the back plate will be described with respect to FIG. 7.

Figure 4:
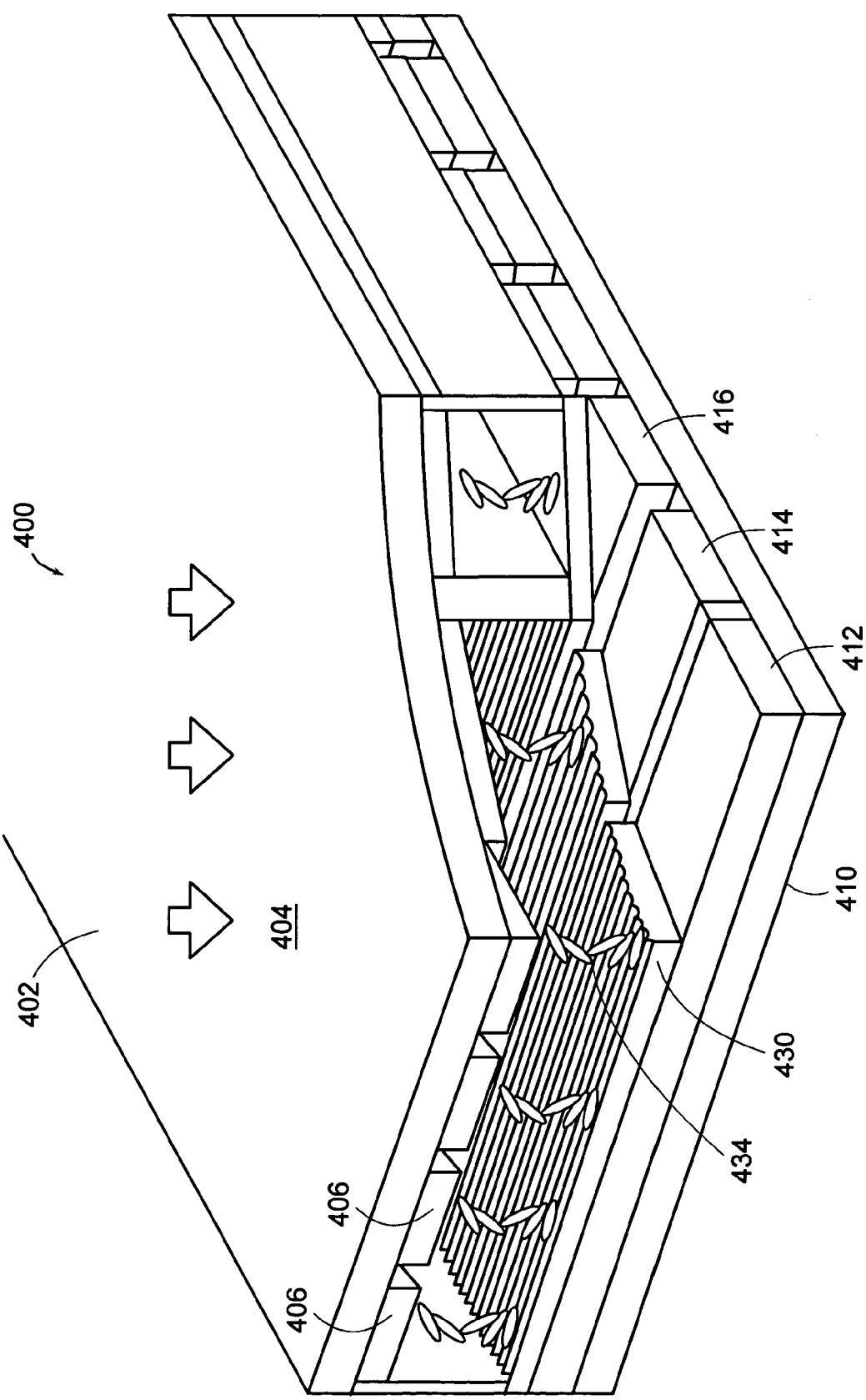
FIG. 4 shows a cross-sectional view of a passive matrix display according to the present invention.

Referring to FIG. 4, a cross sectional view of the passive display of the present invention is shown generally at 400. Back plate 402 of the display includes spaced-apart transparent ITO electrode lines 406 patterned directly onto the back of polarizing filter 404. However, it is understood that a glass substrate may be used as shown in the back plate formed according to FIG. 3.

Front plate 410 includes color filter lines 412, 414, and 416 which are directed to the red, green, and blue filters, respectively, and patterned directly onto front polarizing filter 420. It is also understood that a glass substrate may be used as shown in the front plate formed according to FIG. 2.

The passive matrix display at 400 includes spacers 434 to separate the front plate and back plate. The space between the plates contains liquid crystals 440. Transparent ITO electrode lines 430 are aligned onto color filters 412, 414, and 416. Finally, the electrodes 406 and 430 are LC aligned. While ITO is the standard electrode material for displays, modest electrical conductivity is a significant limitation in passive matrix displays where signals must traverse the entire display through ITO address lines. To achieve grayscale in a liquid crystal display, a range of voltages may be applied to obtain intermediate states of liquid crystal switching or a pulse width modulation ("PWM") approach may be employed to the same end. In either case, accurate grayscale in passive matrix displays is difficult due to the voltage drop and RC delays resulting from the resistance of ITO.

Passive matrix displays are often set up as simple black-and-white displays without grayscale, using a liquid crystal system with a steep response to voltage so that small voltage differences will effect complete switching. In this way, the voltage loss along an address line is tolerated and the display still switches fully between transmission and blocking of light. Significant voltage drops and RC delay generally make grayscale more difficult to implement in passive matrix displays.

Another aspect of the present invention is an approach to achieving grayscale that operates within the intrinsic nature of a passive matrix. The approach will be described referring to FIG. 5. According to this approach, instead of using a single electrode line, multiple lines of different widths are employed so that each pixel may be switched on to varying fractions of the fully on or fully off states, i.e., grayscale.

Figure 5:
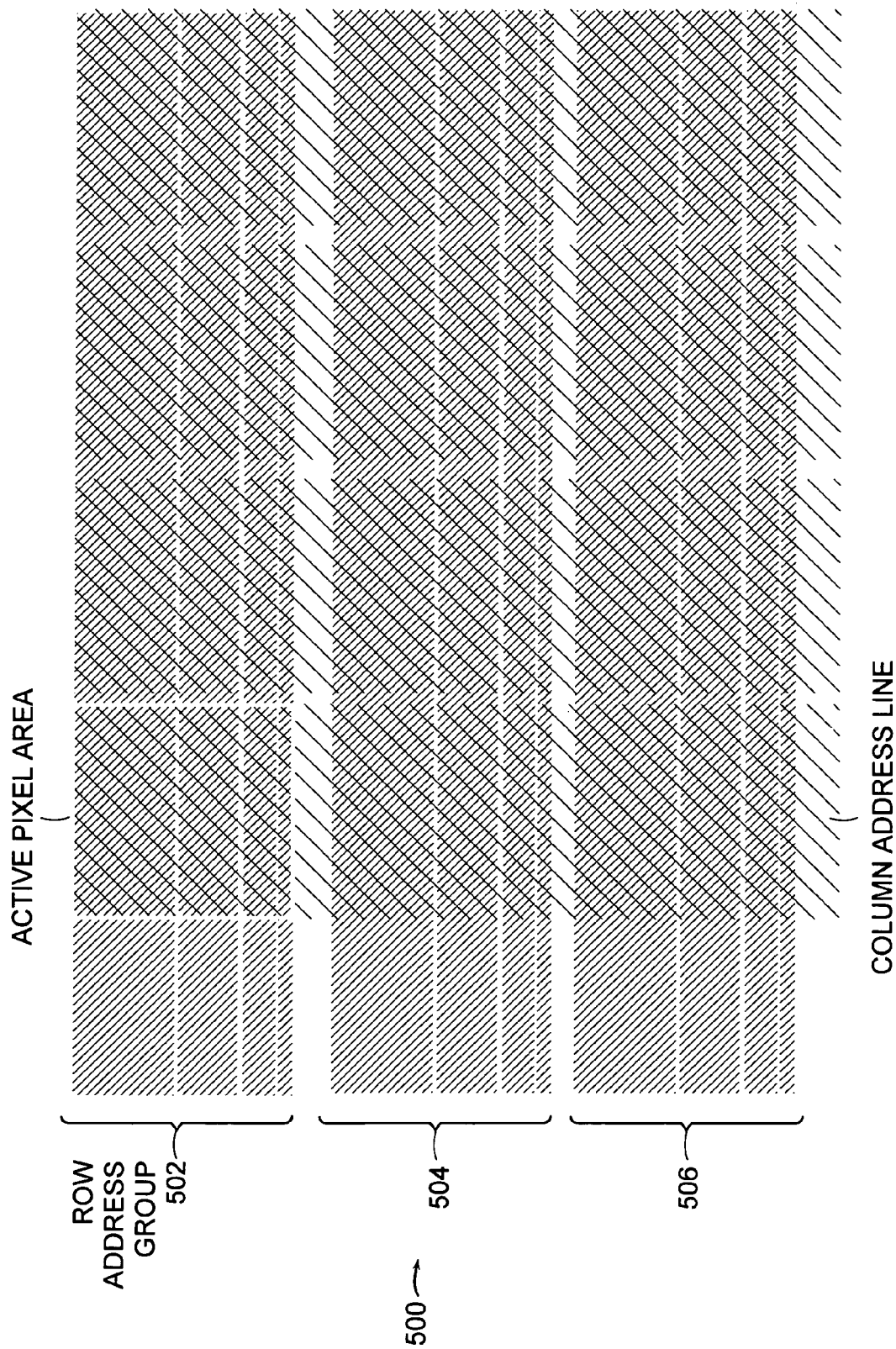
FIG. 5 shows a method of the present invention by which grayscale may be achieved in a passive matrix display by using a group of electrodes of differing area.

As shown in FIG. 5, each row address line enables a four-line address group, such as groups 502, 504, and 506. Although, a four-line group is selected, greater or less than a four-line group may be selected and still be within the scope of the present invention. Each line of a group has a different area so that grayscale may be achieved by using a group of electrodes. These electrodes can be turned on individually or in any combination to switch fractional pixel area. Grayscale may be achieved according to the following Table:

| 4-Bit Grayscale Binary: | Corresponding lines in the ON state: |
|---|---|
| 0000 | All OFF |
| 0001 | D |
| 0010 | C |
| 0011 | CD |
| 0100 | B |
| 0101 | BD |
| 0110 | BC |
| 0111 | BCD |
| 1000 | A |

-continued

| 4-Bit Grayscale Binary: | Corresponding lines in the ON state: |
|---|---|
| 1001 | AD |
| 1010 | AC |
| 1011 | ACD |
| 1100 | AB |
| 1101 | ABD |
| 1110 | ABC |
| 1111 | ABCD |

According to the Table, one of sixteen levels ranging from a completely off to a fully on pixel is achieved bu selection of the appropriate lines of a group. The widths shown for electrode lines A, B, C, D are illustrative only and represent an approximately linear increase in the fraction of the pixel area that is switched with respect to progression through the 16 states of grayscale described at the bottom of the figure. Alternatively, a logarithmic dependence could be configured if desired.

Figure 6:
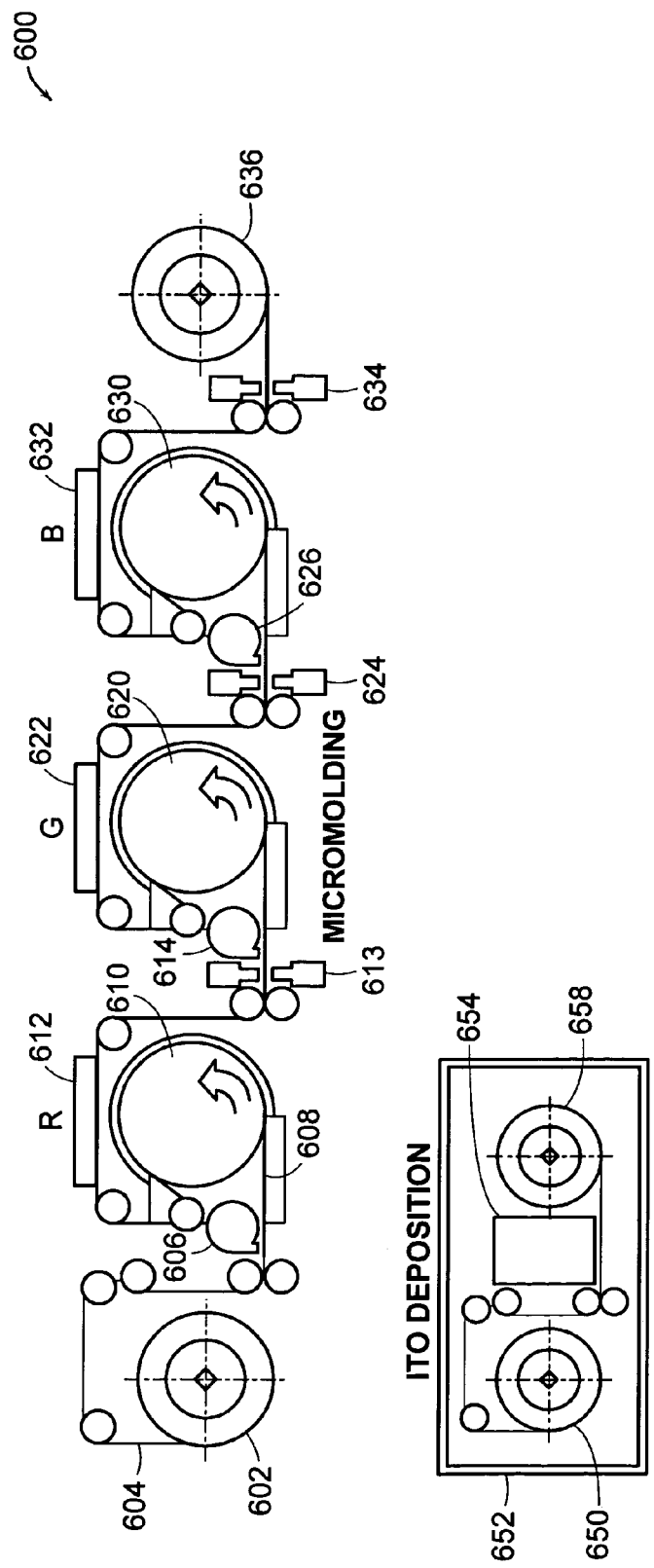
FIG. 6 shows a system for fabricating the front plate according to the present invention.
Figure 6:
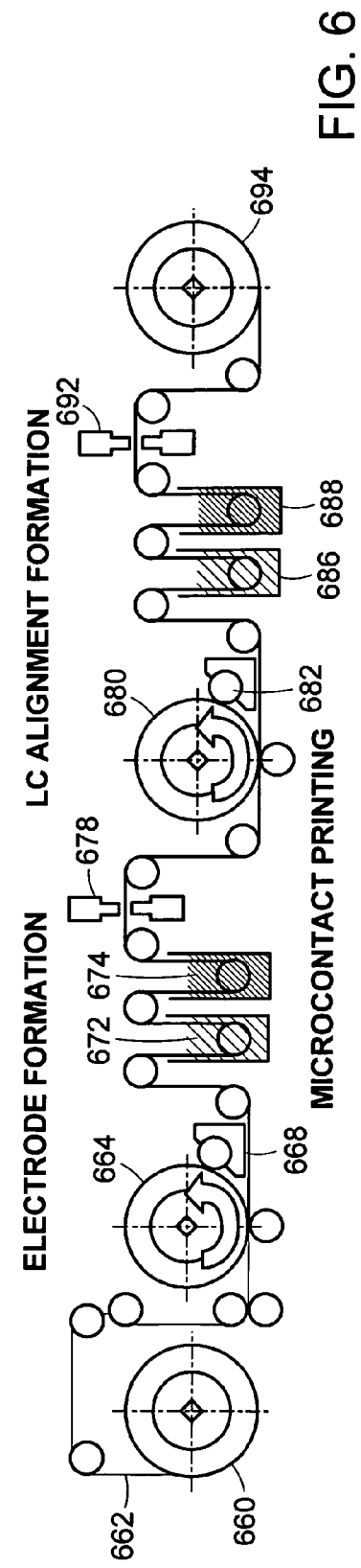
Figure 8:
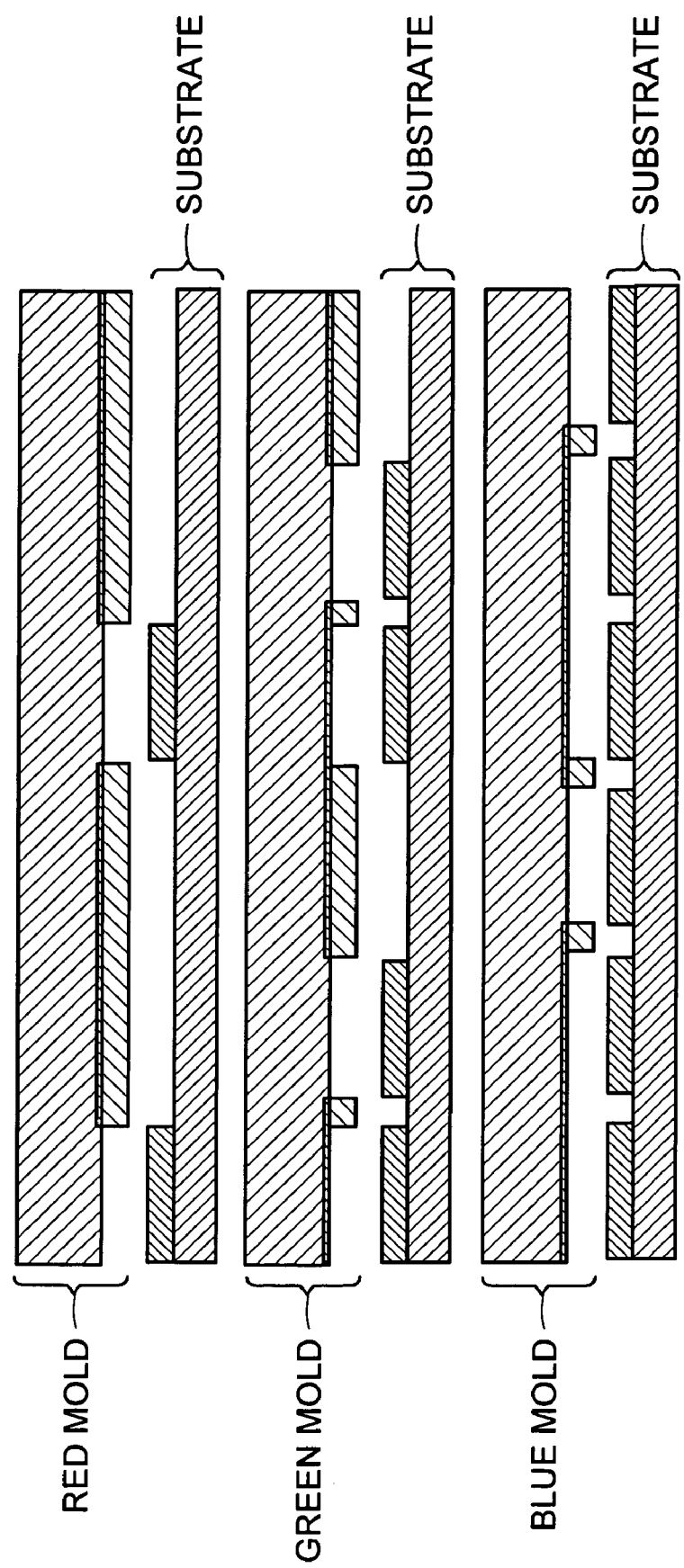
FIG. 8 shows a method for forming of the color filters.

FIG. 6 generally at 600, shows a system for forming the self-alignment front plate according to the present invention. Feed reel 602 supplies flexible backing on to which is disposed the polarizing filter film 604. At the station including filter material dispense station 606, stamp/semi-cure drum 610, cure station 612, and inspection station 613. The red filter is molded on the polarized film. The mold face of drum 610 is shown at FIG. 8. After the red filter is applied to the polarizing film, the green filler is molded onto the polarizing film by filler material dispense station 614, stamp/semi-cure drum 620, and cure station 622 and inspection station 624. Similarly, the blue filter is formed by filter material dispense station 626, stamp/semi-cure drum 630, cure station 632, and inspection station 634. After leaving inspection station 634, the front plate structure is wound onto take-up reel 636.

The front plate structure may also include the appropriate disposition of black matrix lines in the recesses between color filters which serve the purpose previously described.

Next, the face plate material from reel 636 is transferred to reel 650 or reel 636 is disposed at 650. ITO is then deposited over the surface of the color filter/polarizing film web 652. The ITO vacuum deposition system includes ITO disposition 654 and take-up reel 658.

The material on reel 660 is transported at 662 to drum 664. Drum 664 has etch-resist deposited on its circumference at reservoir 668. This etch resist is placed on the raised surface of the color filters but not in the recessors between the filters. The etch resist coated structure is passed through etch bath 672 then rinse 674. This will leave the ITO aligned with the color filters.

Next, the circumference of roller 680 will receive etch-resist from reservoir 682. The circumference is patterned for placing alignment ridges in the ITO by microcontact printing a pattern of fine lines of, for example, a self-assembled monolayer. Once this is done the web is passed through etch solution 686 and rinse 688 and inspect at inspection station 692. After this is completed, front plate is wound into take-up reel 694.

Figure 7:
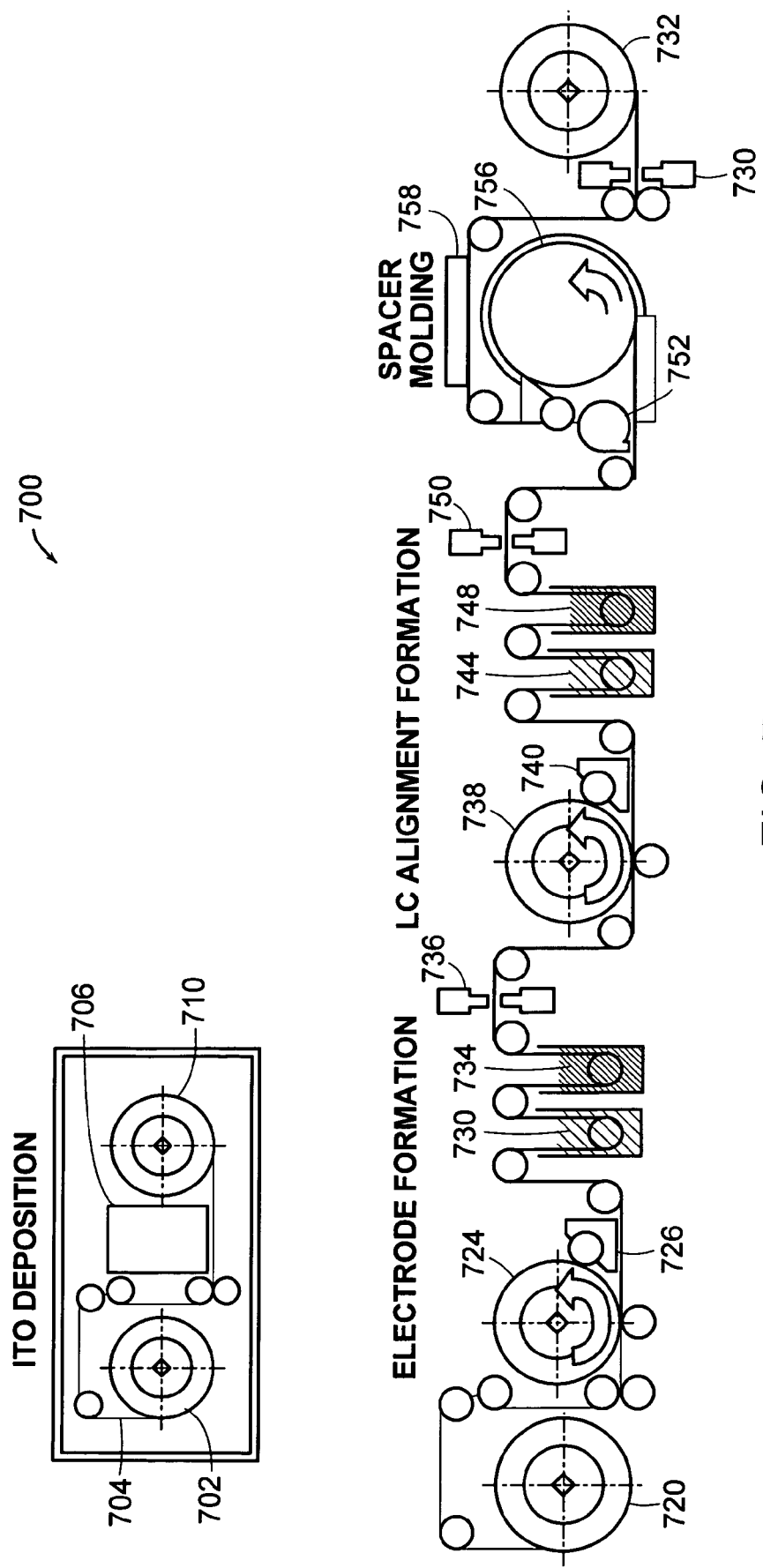
FIG. 7 shows a system for fabricating the back plate according to the present invention.

Referring to FIG. 7, generally at 700, the process for forming the back plate will be described. The process for fabrication of the back plate/film of the present invention begins with the indium tin oxide being deposited onto one side of polarizing filter film. To pattern the electrode lines into the indium tine oxide, the web is passed into contact with a drum on which an elastomeric stamp has been affixed. The stamp has raised features in the pattern desired for the electrode lines. The stamp is inked with an agent that will form an etch block on the ITO, for example, an agent that will form a self-assembled monolayer, and transfers the agent to the ITO surface according to the pattern of the stamp. An etch and rinse are performed and the web inspected by in-line metrology. A liquid crystal alignment layer is patterned on the ITO electrode lines as described in FIG. 8.

According to FIG. 7, a polarizing film on flexible backing layer at 704 form reel 702 has ITO disposed on it by a vacuum disposition system that includes ITO dispenser 706. The film with ITO deposited on it is wound on to take-up reel 710.

The polarizing film with ITO disposed on it is disposed at reel 720. Next, etch-resist is patterned onto the ITO. This is done by passing the web in contact with drum 724 on which an elastomeric stamp has been affixed. The stamp has raised features in the pattern desired for the electrode lines. The stamp is coated with etch-resist that will form an etch block on the ITO, for example an agent that will form a self-assembled monolayer, and transfers the agent to the ITO surface according to the pattern of the stamp. The coated ITO is then sent through etch bath 730 and rinse 734. This results in the formation of the electrode lines. The web is inspected at inspection station 736.

At drum 738, a liquid crystal (LC) alignment layer is patterned on the ITO electrodes. This is done by coating the patterned drum 738 and imparting it to the ITO. The drum is coated with etch-resist from reservoir 740. The web is passed through etch bath 744, then rinse 748. Following this, it is inspected at inspection station 750.

Finally at the station including spacer material dispense station 752, stamp/semi-cure roller 756 and cure station 758, spacers are formed on the back plate. This structure is inspected at inspection station 730 and wound to take up reel 752.

Referring to FIG. 8, generally at 800, a method for forming the color filters is shown. These methods may be used in the process described in FIG. 6.

Figure 9:
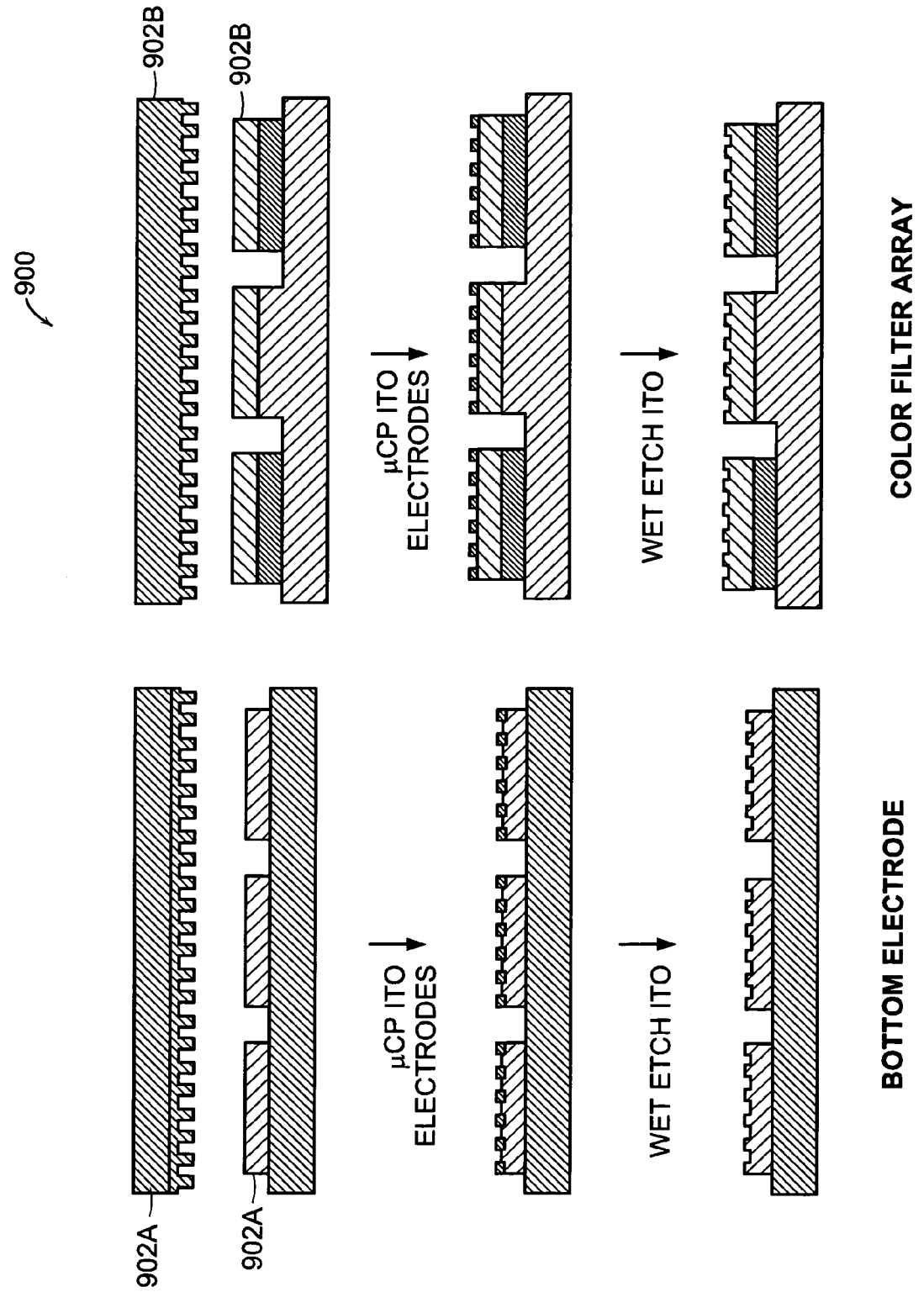
FIG. 9 shows a method of using soft lithography to pattern liquid crystal alignment layers into ITO electrode.

FIG. 9, generally at 900, shows a soft lithography process for fabricating integrated LC alignment layers. This involves patterning of LC alignment layers into ITO electrode lines. The same process applies to the front and back layers of the display. Elastomeric stamp 902A, 902B having raised features is used to microcontact print a pattern of a suitable etch resist (e.g. a self-assembled monolayer) onto the ITO electrodes 904A, 904B. Immersion of these assemblies into respective etch baths transfer the pattern of the etch-resist into the surface of the ITO layers.

In addition to the processing described above for fabricating ITO electrodes on the back plate, and the ITO electrodes that are self-registered to the color filter layer, it is understood that a similar process may be used to create a liquid crystal alignment layer on both the back plate and the color filter layer which is on the surface of the ITO layer.

The terms and expressions that are employed herein are terms of description and not of limitation. There is no intention in the use of such terms and expressions of excluding the equivalents of the feature shown or described, or portions thereof, it being recognized that various modifications are possible within the scope of the invention as claimed.

The invention claimed is:

1. A method for forming a flexible back plate for a display on a nonlinear roller-based system having a plurality of stations comprising the steps of:
   forming an indium tin oxide (ITO) layer on a flexible substrate:
   patterning the ITO layer with etch-resist material and form action protected areas to define electrode lines;
   etching the ITO layer in areas unprotected by etch-resist material; and
   forming light separating material in recesses between electrode lines.

2. A method for forming a flexible faceplate for a display on a nonlinear roller-based system having a plurality of stations comprising the steps of:
   forming light separating a material on a flexible substrate to define color filter lines;
   forming color filter lines in areas between the light separating material, with each color filter line having a height greater than the light separating material;
   forming an indium tin oxide (ITO) layer over the color filter lines and light separating material;
   depositing etch-resist on the color filter lines; and
   etching the ITO from recesses between the color filter lines over the light separating material.

3. A method for forming a faceplate for a display on a flexible backing on a nonlinear roller-based system having a plurality of stations, with at least one station being nonlinear, comprising the steps of:
   (a) transporting the flexible backing with a first polarizing film material thereon to a first station for dispensing, defining, and curing a first filter material at a plurality of spaced locations on the first polarized film material;
   (b) transporting the flexible backing with the first polarizing film material with the first filter material formed at step (a) thereon to a second station for dispensing, defining, and curing a second filter material on the first polarized film material at a plurality of locations adjacent to and spaced from the first filter material;
   (c) transporting the flexible backing with the first polarizing film material with the first and second filter material formed at steps (a) and (b) thereon to a third station for dispensing, defining, and curing a third filter material on the first polarized film material at a plurality of locations adjacent to and spaced from the second and first filter material;
   (d) transporting the flexible backing with the first polarizing film material with the first, second, and third filter material formed that steps (a), (b), and (c), respectively, thereon to a fourth station for depositing electrode material over the first, second, and third filter material and the first polarizing film material exposed between the first, second, and third filter material;
   (e) transporting the flexible backing with the first polarizing film material with the first, second, and third filter material thereon and the electrode material deposited at step (d) to a fifth station for depositing patterned etch-resist on the electrode material over the first, second, and third filter material;
   (f) transporting the flexible backing with the first polarizing film material with the first, second, and third filter material thereon and the electrode material deposited at step (d) with patterned etch-resist thereon to a sixth station for removing the electrode material from areas on which patterned etch-resist is not deposited;
   (g) transporting the flexible backing with the first polarizing film material with the first, second, and third filter material that have an electrode thereon to a seventh station for depositing etch-resist on each electrode for forming alignment structures therein; and
   (h) transporting the flexible backing with the first polarizing film material with the first, second, and third filter material that have an electrode thereon with patterned etch-resist for forming alignment structures therein to an eighth station for removing the electrode material from areas on which patterned etch-resist is not deposited.

4. The method as recited in claim 3, wherein the first station is nonlinear.

5. The method as recited in claim 3, wherein the second station is nonlinear.

6. The method as recited in claim 3, wherein the third station is nonlinear.

7. The method as recited in claim 3, wherein the fourth station is nonlinear.

8. The method as recited in claim 3, wherein the fifth station is nonlinear.

9. The method as recited in claim 3, wherein the sixth station is nonlinear.

10. The method as recited in claim 3, wherein the seventh station is nonlinear.

11. The method as recited in claim 3, wherein the eighth station is nonlinear.

12. The method as recited in claim 3, wherein the electrode material includes indium tin oxide (ITO).

13. A method for forming a back plate for a display on a flexible backing on a nonlinear roller-based system having a plurality of stations, with at least one station being nonlinear, comprising the steps of:
   (a) transporting the flexible backing with a first polarizing film material thereon to a first station for depositing an electrode material on the first polarizing film material;
   (b) transporting the flexible backing with the first polarizing film material with the electrode material thereon to a second station for depositing patterned etch-resist on the electrode material to define a plurality of spaced electrodes in the electrode material;
   (c) transporting the flexible backing with the first polarizing film material with the electrode material that has patterned etch-resist thereon to define a plurality of spaced electrodes to a third station for removing the electrode material from areas on which the patterned etch-resist is not deposited;
   (d) transporting the flexible backing with the first polarizing film material with the plurality of electrodes thereon to a fourth station for depositing etch-resist on the plurality of electrodes for forming alignment structures therein;
   (e) transporting the flexible backing with the first polarizing film material with the plurality of electrodes thereon that have etch-resist for forming alignment structures therein to a fifth station for removing the electrode material from areas of the plurality of electrodes on which etch-resist is not deposited; and
   (f) transporting the flexible backing with the first polarizing film material with the plurality of electrodes with alignment structure therein to a sixth station for forming spacers between the plurality of electrodes, with the spacers having a height greater than the electrodes.

14. The method as recited in claim 13, wherein the first station is nonlinear.

15. The method as recited in claim 13, wherein the second station is nonlinear.

16. The method as recited in claim 13, wherein the third station is nonlinear.

17. The method as recited in claim 13, wherein the fourth station is nonlinear.

18. The method as recited in claim 13, wherein the fifth station is nonlinear.

19. The method as recited in claim 13, wherein the sixth station is nonlinear.

20. The method as recited in claim 13, wherein the electrode material includes indium tin oxide (ITO).

* * * * *